United States Patent [19]

Tomeo, Jr.

[11] Patent Number: 4,796,374
[45] Date of Patent: Jan. 10, 1989

[54] FISHING LURE

[76] Inventor: Peter F. Tomeo, Jr., 1747 Keats, Madison Heights, Mich. 48071

[21] Appl. No.: 101,432

[22] Filed: Sep. 28, 1987

[51] Int. Cl.$^4$ .................... A01K 85/00; A01K 83/00
[52] U.S. Cl. .................................................. 43/35
[58] Field of Search ........................ 43/34, 35, 36, 37

[56] References Cited

U.S. PATENT DOCUMENTS

| 3,757,450 | 9/1973 | Martinez et al. | 43/35 |
| 4,669,215 | 6/1987 | Ringuette | 43/34 |

FOREIGN PATENT DOCUMENTS

| 472421 | 3/1951 | Canada | 43/35 |
| 492195 | 4/1953 | Canada | 43/35 |
| 90698 | 11/1937 | Sweden | 43/35 |
| 154301 | 5/1956 | Sweden | 43/35 |

Primary Examiner—M. Jordan
Attorney, Agent, or Firm—Gerald E. McGlynn, Jr.

[57] ABSTRACT

A fishing lure includes a body support for connection to a line. A first hook is connected to the body support and adapted to be engaged by an object. A second hook is connected to the body support for engaging the object and has an open cocked position and a closed position engaging the object. The second hook pivotally rotates relative to the first hook. A first biasing mechanism biases the second hook toward the first hook. A trip mechanism is connected to the line and engages the second hook for supporting the second hook in the open cocked position and for releasing the second hook to allow the second hook to move toward the closed position in response to engagement by the object with the first hook. A second biasing mechanism adjustably provides a predetermined amount of force on the trip mechanism to release the second hook from the open cocked position for movement toward the closed position to engage the object.

27 Claims, 2 Drawing Sheets

4,796,374

FISHING LURE

TECHNICAL FIELD

The subject invention relates to a fishing lure, and particularly, a fishing lure with a spring-loaded secondary hook.

BACKGROUND ART

Fishing lures having a primary hook and a spring-loaded secondary hook have been used in the past. Examples of such fishing lures are disclosed in U.S. Pat. No. 4,670 issued Jul. 28, 1846 to Engelbrecht et al. This patent discloses a primary hook for a fish to engage and a secondary hook pivotally connected to the first hook. The secondary hook is held in an open cocked position by a trip mechanism connected to a fishing line. In operation, the fish would engage the primary hook and increase the tension on the line connected to the trip mechanism to disengage the secondary hook for engaging the fish to prevent escape.

Other examples of such fishing lures are disclosed in U.S. Pat. No. 2,149,923, issued Mar. 7, 1939 to Martin; U.S. Pat. No. 3,618,251, issued Nov. 9, 1971 to Hodshire; and U.S. Pat. No. 4,638,591, issued Jan. 27, 1987 to Neumann et al.

The problem with the above fishing lures is that no means is provided for adjustably predetermining the amount of pulling force required to release the trip mechanism. Further, the pulling force device is not removably attached to the fishing lure to allow the pulling force to be varied or adjusted to different predetermined levels.

STATEMENT OF THE INVENTION AND ADVANTAGES

A fishing lure includes a body support means for connection to a line. A first hook means is connected to the body support means and adapted to be engaged by an object. A second hook means is connected to the body support means for engaging the object and has an open cocked position and a closed position engaging the object. A pivotal means allows the second hook means to pivotally rotate relative to the first hook means. A first biasing means biases the second hook means toward the first hook means. A trip means is connected to the line and engages the second hook means for supporting the second hook means in the open cocked position and for releasing the second hook means to allow the second hook means to move toward the closed position in response to engagement by the object with the first hook means. A second biasing means adjustably provides a predetermined amount of force on the trip means to release the second hook means from the open cocked position for movement toward the closed position to engage the object.

Accordingly, the subject invention allows the predetermined pulling force on the trip mechanism to be adjusted. Further, the predetermined pulling force mechanism is removably attached to provide a wide range of predetermined levels.

FIGURES IN THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 1:
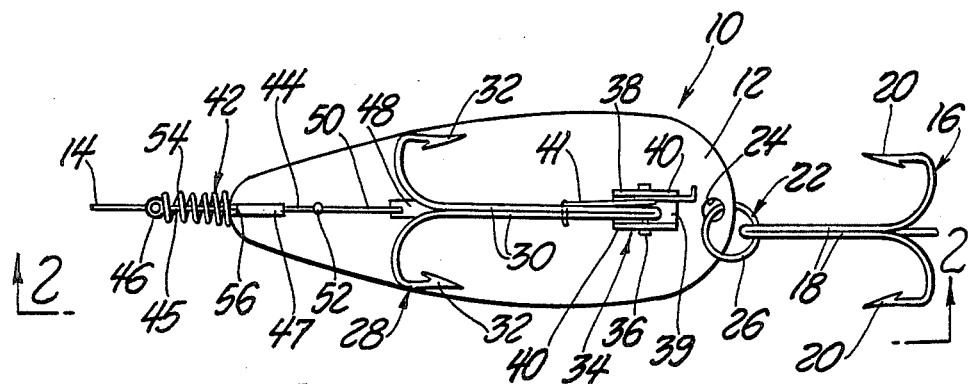
FIG. 1 is a plan view of a preferred embodiment of the invention.
Figure 2:
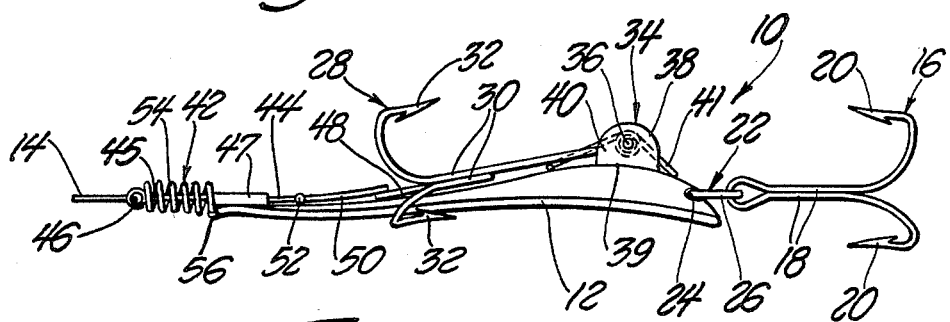
FIG. 2 is an elevational view of the preferred embodiment of FIG. 1.

A preferred embodiment of a fishing lure for "catching" fish is generally shown at 10 in FIG. 1. The fishing lure 10 includes body support means 12 for connection to a fishing line 14. The fishing line 14 may be attached to a conventional fishing rod and reel (not shown). The body support means 12 may comprise a thin plate or have any other configuration for attracting fish.

The fishing lure 10 includes a first hook means, generally indicated at 16, connected to one end of the body support means 12 and is adapted to be engaged by a fish. The first hook means 16 comprises at least one hook-shaped member 18 having at least one barb 20. In other words, the first hook means 16 comprises a member having a J-shaped configuration with a barb 20 at the end thereof. The first hook means 16 may be a conventional treble hook or the like. As the lure 10 is pulled through the water, a fish will attempt to swallow the lure 10 and the first hook means 16 and the barbs 20 will engage the fish's mouth to secure the fish to the fishing lure 10.

The fishing lure 10 includes a pivotal means, generally indicated at 22, for allowing the first hook member 18 to pivotally rotate. The pivotal means 22 comprises an aperture 24 communicating through the body support means 12 and an eyelet 26 disposed in the aperture 24 and connected to one end of the first hook-shaped member 18 to allow the first hook-shaped member 18 to pivotally rotate.

The fishing lure 10 also includes a second hook means, generally indicated at 28, connected to the body support means 12 for engaging the fish. The second hook means 28 has an open cocked position and a closed position for engaging the fish. The second hook means 28 comprises at least one second hook-shaped member 30 having at least one second barb 32. The second hook means 28 is similar in construction to the first hook means 18.

The fishing lure 10 further includes a pivotal means, generally indicated at 34, for allowing the second hook-shaped member 30 to pivotally rotate relative to the first hook-shaped member 18. The pivotal means 34 comprises a shaft 36 connected to one end of the second hook-shaped member 30 and a support member 38. The support member 38 comprises a base portion 39 and a pair of side flanges 40 to pivotally support the shaft 36 in spaced relationship to the body support means 10. One end of the second hook-shaped member 30 is disposed about the shaft 36 between the side flanges 40 of the support member 38.

The fishing lure 10 includes a first biasing means 41 for pivotally biasing the second hook-shaped member 30 toward the first hook-shaped member 18. The first biasing means 41 comprises a coiled spring 41 disposed about the shaft 36 and has one end engaging the second hook-shaped member 30 and the other end engaging the body support means 10. The coiled spring 41 urges the second hook-shaped member 30 toward the first hook-shaped member 18. This allows the second hook-shaped member 30 to operate similar to a conventional "mouse trap" having an open cocked position and a closed position engaging the object.

The fishing lure 10 also includes trip means, generally indicated at 42, connected to the fishing line 14 and engaging the second hook means 28 for supporting the second hook means 28 in the open cocked position and for releasing the second hook means 28 to allow the second hook means 28 to move toward the closed position in response to engagement by the fish with the first hook means 16. The trip means 42 comprises a rod member 44 having a first end 45 connected to an eyelet 46 which is, in turn, connected to the fishing line 14. A tubular means 47 forming a tube 47 is connected to the body support means 10 at the end opposite the first hook means 18. The rod member 44 is slidably disposed within the tube 47. The tube 47 guides the rod member 44 axially in a substantially straight line path. A tubular means 48 forming a tube 48 is connected to the second hook-shaped member 30. The tube 48 is in series with the tube 47 when the second hook-shaped member 30 is in open cocked position. The rod member 44 has a second end 50 slidably disposed in the tube 48 to support the second hook-shaped member 30 in the open cocked position. The rod member 44 also includes a stop means 52 for preventing the rod member 44 from being slidably disposed or exiting from the tube 47. The stop means 52 comprises a projection 52 being longer than or having a diameter greater than that of the tube 47 to prevent the rod member 44 from being completely removed from the tube 48.

The fishing lure 10 further includes a second biasing means 54 removably interconnecting the fishing line 14 and the body support means 10 for biasing the second end 50 of the rod member 44 in the tube 48. The second biasing means 54 comprises a spring 54 having a first end connected to the eyelet 46 and a second end connected to or may be disposed in an aperture 56 in the body support means 12. The spring 54 provides a predetermined amount of force required between the first hook 18 and the fishing line 14 to allow the rod member 44 to be disengaged from the tube 48 to release the second hook-shaped member 30 for movement toward the closed position to engage the fish. In other words, the second spring 54 may be removably connected to the fishing lure 10 to adjust the predetermined amount of pulling force required to trip the trip means 42 by using a variety of second springs 54 with different spring rates. Since the distance required to disengage the second end 50 of the rod member 44 remains constant, the various spring rates of the second spring 54 will provide corresponding predetermined pulling forces.

In operation, a fish would attempt to swallow the first hook-shaped member 18 of the fishing lure 10. The second end 50 of the rod member 44 is disposed in the tube 48 in the open cocked position. Once the fish has engaged the first hook-shaped member 18, tension on the fishing line 14 would be sufficient to slidably displace the second end 50 of the rod member 44 axially away from the first hook-shaped member 18. When the predetermined pulling force or corresponding tension on the fishing line 14 is reached, the second end 50 of the rod member 44 will be completely displaced from the tube 48 of the second hook-shaped member 30. The second hook-shaped member 30 would be biased by the coil spring 41 toward the first hook-shaped member 18 to engage the fish. Hence, the fishing lure 10 operates similarly to a conventional "mouse trap".

Figure 3:
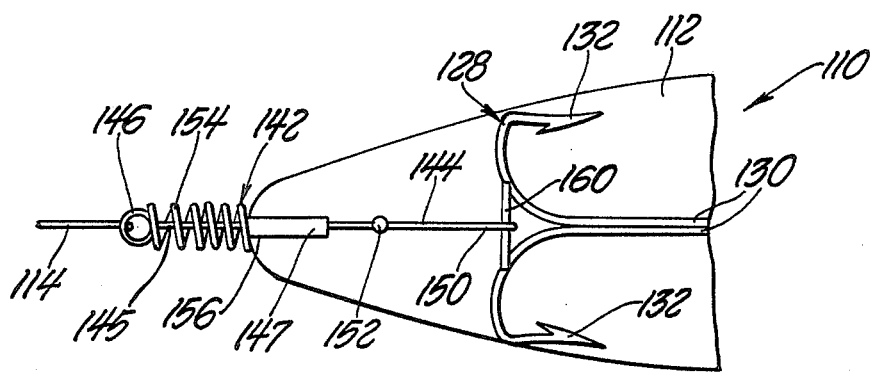
FIG. 3 is a partial plan view of a first alternate embodiment of the invention.

An alternate first embodiment of the fishing lure of the subject invention, wherein like parts have like numerals increased by 100, is generally shown at 110 in FIG. 3. The fishing lure 110 is similar in construction to the preferred embodiment 10 except that the second end 150 of the rod member 144 is not disposed in a tube. Instead, the fishing lure 110 includes a bar 160 attached between a pair of second hook-shaped members 130. The second end 150 of the rod member 144 is placed over the bar 160. In other words, the bar 160 would be displaced partially below the second end 150 of the rod member 144. In operation, when the second end 150 of the rod member 144 is displaced or slides across the bar 160, the second hook-shaped member 130 will be released to move toward the closed position. Hence, the operation of the fishing lure 110 is similar to the fishing lure 10 of the preferred embodiment.

Figure 4:
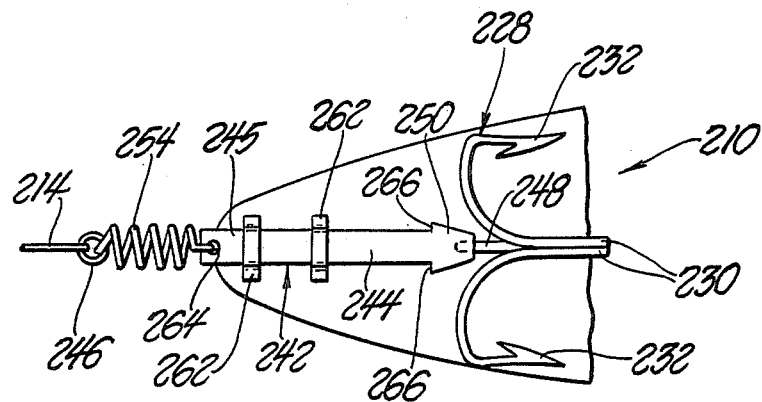
FIG. 4 is a partial plan view of a second alternate embodiment of the invention.

A second alternate embodiment of the fishing lure of the subject invention, wherein like parts have like numerals increased by 200, is generally shown at 210 in FIG. 4. The fishing lure 210 includes a rod member 244 being a flat bar and having a trapezoidal shaped second end 250. A pair of longitudinally spaced straps 262 are secured to the body support means 212 and replaces the tube to axially guide the rod member 244 in a substantially straight line path. The rod member 244 is slidably disposed within the straps 262. The second spring 254 interconnects the eyelet 246 and is disposed in an aperture 264 in the first end 245 of the rod member 244. The rod member 244 has a second end 250 which engages a projection 248 which may be a tube or cylindrical rod on the second hook-shaped member 230 to hold the second hook-shaped member 230 in the open cocked position. The projection 248 would be displaced partially below the second end 250 of the rod member 244. The second end 250 of the rod member 244 includes outwardly extending flanges or shoulders 266 having a width longer than the opening of the straps 262 to act as a stop means. The operation of the fishing lure 210 is similar to the fishing lure 10 of the preferred embodiment.

Figure 5:
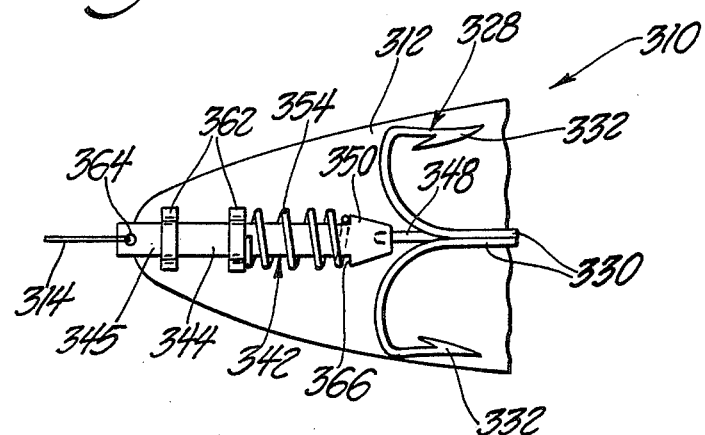
FIG. 5 is a partial plan view of a third alternate embodiment of the invention.

A third alternate embodiment of the fishing lure of the subject invention, wherein like parts have like numerals increased by 300, is generally shown at 310 in FIG. 5. The fishing lure 310 has the second spring 354 interconnected between the shoulders 366 of the second end 350 of the rod member 344 and one of the strap members 362. The operation of the fishing lure 310 is similar to the fishing lure 10 of the preferred embodiment.

The subject invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the subject invention may be practiced otherwise than as specifically described.

What is claimed is:

1. A fishing lure comprising: body support means for connection to a line;
   a first hook means connected to said body support means adapted to be engaged by an object;
   a second hook means connected to said body support means for engaging the object and having an open cocked position and a closed position engaging the object;
   pivotal means for allowing said second hook means to pivotally rotate relative to said first hook means;
   first biasing means for biasing said second hook means toward said first hook means;
   trip means connected to the line and engaging said second hook means for supporting said second hook means in said open cocked position and for releasing said second hook means to allow said second hook means to move toward said closed position in response to engagement by the object with said first hook means.
   second biasing means for adjustably providing a predetermined amount of force on said trip means to release said second hook means from said open cocked position for movement toward said closed position to engage the object;
   said second hook means including a first tubular means forming a first tube connected thereto; and
   said trip means comprising a rod member having a first end connected to the line and having a second end slidably disposed in said first tubular means to support said second hook means in said open cocked position.

2. A fishing lure as set forth in claim 1 characterized by said second biasing means removably interconnecting the fishing line and said trip means.

3. A fishing lure comprising: body support means for connection to a line;
   a first hook means connected to said body support means adapted to be engaged by an object;
   a second hook means connected to said body support means for engaging the object and having an open cocked position and a closed position engaging the object;
   pivotal means for allowing said second hook means to pivotally rotate relative to said first hook means;
   first biasing means for biasing said second hook means toward said first hook means;
   trip means connected to the line and engaging said second hook means for supporting said second hook means in said open cocked position and for releasing said second hook means to allow said second hook means to move toward said closed position in response to engagement by the object with said first hook means;
   second biasing means for adjustably providing a predetermined amount of force on said trip means to release said second hook means from said open cocked position for movement toward said closed position to engage the object;
   said second hook means including bar means forming a bar connected thereto; and
   said trip means comprising a rod member having a first end connected to the line and having a second end slidably disposed in engagement with said bar means to support said second hook means in said open cocked position.

4. A fishing lure as set forth in claim 3 further characterized by said second biasing means comprising a spring interconnecting the line and said body support means for biasing said second end of said rod member in said first tubular means.

5. A fishing lure as set forth in claim 4 including a second tubular means forming a second tube connected to said body support means, said rod member being slidably disposed within said second tubular means.

6. A fishing lure as set forth in claim 5 characterized by said rod member including stop means for preventing said rod member from being slidably disposed from said second tubular means.

7. A fishing lure as set forth in claim 6 further characterized by said first pivotal means comprising a shaft and a support member connected to said body support means to pivotally support said shaft in spaced relationship thereto.

8. A fishing lure as set forth in claim 7 further characterized by said first biasing means comprising a first spring disposed about said shaft and engaging said second hook means.

9. A fishing lure as set forth in claim 8 including second pivotal means for allowing said first hook means to pivotally rotate.

10. A fishing lure as set forth in claim 9 characterized by said second pivotal means comprising an aperture in said body support means and an eyelet disposed in said aperture and connected to said first hook means to allow said first hook means to pivotally rotate.

11. A fishing lure as set forth in claim 10 further characterized by said first hook means comprising at least one hook-shaped member having at least one barb.

12. A fishing lure as set forth in claim 11 further characterized by said second hook means comprising at least one hook-shaped member having at least one barb.

13. A fishing lure as set forth in claim 4 further characterized by said first biasing means comprising a first spring disposed about said shaft and engaging said second hook means.

14. A fishing lure as set forth in claim 13 including second pivotal means for allowing said first hook means to pivotally rotate.

15. A fishing lure as set forth in claim 14 characterized by said second pivotal means comprising an aperture in said body support means and an eyelet disposed in said aperture and connected to said first hook means to allow said first hook means to pivotally rotate.

16. A fishing lure as set forth in claim 15 further characterized by said stop means comprising at least one flange extending outwardly from said member.

17. A fishing lure as set forth in claim 16 further characterized by said first hook means comprising at least one hook-shaped member having at least one barb.

18. A fishing lure as set forth in claim 17 further characterized by said second hook means comprising at least one hook-shaped member having at least one barb.

19. A fishing lure comprising: body support means for connection to a line;
   a first hook means connected to said body support means adapted to be engaged by an object;
   a second hook means connected to said body support means for engaging the object and having an open cocked position and a closed position engaging the object;
   pivotal means for allowing said second hook means to pivotally rotate relative to said first hook means;
   first biasing means for biasing said second hook means toward said first hook means;
   trip means connected to the line and engaging said second hook means for supporting said second hook means in said open cocked position and for releasing said second hook means to allow said second hook means to move toward said closed position in response to engagement by the object with said first hook means;

second biasing means for adjustably providing a predetermined amount of force on said trip means to release said second hook means from said open cocked position for movement toward said closed position to engage the object;

projection means forming a projection extending outwardly from said second hook means;

a strap means forming at least one strap connected to said body support means;

said trip means comprising a member slidably disposed between said strap means and said body support means and having a first end and a second end slidably disposed in engagement with said projection means to support said hook means in said open cocked position.

20. A fishing lure as set forth in claim 19 characterized by said rod member including stop means for preventing said member from being slidably disposed from said strap means.

21. A fishing lure as set forth in claim 20 further characterized by said second biasing means comprising a spring interconnecting the line and said second end of said member.

22. A fishing lure as set forth in claim 20 characterized by said second biasing means comprising a spring disposed about said member between said second end of said member and said strap means.

23. A fishing lure comprising: body support means for connection to a fishing line;

a first hook means connected to said body support means adapted to be engaged by a fish;

a second hook means connected to said body support means for engaging the fish and having an open cocked position and a closed position for engaging the fish;

first pivotal means for allowing said second hook means to pivotally rotate relative to said first hook means;

first biasing means for pivotally biasing said second hook means toward said first hook means;

second pivotal means for allowing said first hook means to pivotally rotate;

said second hook means including a first tubular means forming a first tube connected thereto;

a second tubular means forming a second tube connected to said body support means;

trip means connected to the line and engaging said second hook means for supporting said second hook means in said open cocked position and for releasing said second hook means to allow said second hook means to move toward said closed position in response to engagement by the fish with said first hook means; said trip means comprising a rod member having a first end connected to the fishing line and being slidably disposed within said second tubular means and having a second end slidably disposed in said first tubular means to support said second hook means in said open cocked position;

second biasing means removably interconnecting the fishing line and said body support means for biasing said second end of said rod member in said first tubular means and for providing a predetermined amount of force on said trip means to allow said rod member to be disengaged from said first tubular means to release said second hook means from said open cocked position for movement toward said closed position to engage the fish;

said rod member including stop means for preventing said rod member from being slidably disposed from said second tubular means;

said first pivotal means comprising a shaft and a support member connected to said body support means to pivotally support said shaft in spaced relationship thereto;

said first biasing means comprising a first spring disposed about said shaft and engaging said second hook means;

said second biasing means comprising a second spring;

said second pivotal means comprising an aperture in said body support means and an eyelet disposed in said aperture and connected to said first hook means to allow said first hook means to pivotally rotate;

said first hook means comprising at least one hook-shaped member having at least one barb; and said second hook means comprising at least one hook-shaped member having at least one barb.

24. A fishing lure comprising: body support means for connection to a fishing line;

a first hook means connected to said body support means adapted to be engaged by a fish;

a second hook means connected to said body support means for engaging the fish and having an open cocked position and a closed position engaging the fish;

first pivotal means for allowing said second hook means to pivotally rotate relative to said first hook means;

first biasing means for pivotally biasing said second hook means toward said first hook means;

second pivotal means for allowing said first hook means to pivotally rotate;

said second hook means including a bar means forming a bar connected thereto;

a tubular means forming a tube connected to said body support means;

trip means connected to the line and engaging said second hook means for supporting said second hook means in said open cocked position and for releasing said second hook means to allow said second hook means to move toward said closed position in response to engagement by the fish with said first hook means; said trip means comprising a rod member having a first end connected to the fishing line and being slidably disposed within said second tubular means and having a second end slidably disposed in engagement with said bar means to support said second hook means in said open cocked position;

second biasing means removably interconnecting the fishing line and said body support means for biasing said second end of said rod member in engagement with said bar means and for providing a predetermined amount of force on said first hook means to allow said rod member to be disengaged from said bar means to release said second hook means from said open cocked position for movement toward said closed position to engage the fish;

said bar means comprising a bar;

said rod member including stop means for preventing said rod member from being slidably disposed from said second tubular means said stop means comprising a projection extending from said rod member;

said first pivotal means comprising a shaft and a support member connected to said body support means to pivotally support said shaft in spaced relationship thereto;

said first biasing means comprising a first spring disposed about said shaft and engaging said second hook means;

said second biasing means comprising a second spring;

said second pivotal means comprising an aperture in said body support means and an eyelet disposed in said aperture and connected to said first hook means to allow said first hook means to pivotally rotate;

said first hook means comprising at least one hook-shaped member having at least one barb; and said second hook means comprising at least one hook-shaped member having at least one barb.

25. A fishing lure comprising: body support means for connection to a fishing line;

a first hook means connected to said body support means adapted to be engaged by a fish;

a second hook means connected to said body support means for engaging the fish and having an open cocked position and a closed position engaging the fish;

first pivotal means for allowing said second hook means to pivotally rotate relative to said first hook means;

first biasing means for pivotally biasing said second hook means toward said first hook means;

second pivotal means for allowing said first hook means to pivotally rotate;

said second hook means including projection means forming a projection connected thereto;

strap means forming a pair of axially spaced straps connected to said body support means;

trip means connected to the line and engaging said second hook means for supporting said second hook means in said open cocked position and for releasing said second hook means to allow said second hook means to move toward said closed position in response to engagement by the fish with said first hook means; said trip means comprising a member having a first end and being slidably disposed within said strap means and having a second end slidably disposed in engagement with said projection means to support said second hook means in said open cocked position;

second biasing means removably interconnecting the fishing line and said member for biasing said second end of said member in engagement with said projection means and for providing a predetermined amount of force on said trip means to allow said member to be disengaged from said projection means to release said second hook means from said open cocked position for movement toward said closed position to engage the fish;

said member including stop means for preventing said member from being slidably disposed from said strap means;

said first pivotal means comprising a shaft and a support member connected to said body support means to pivotally support said shaft in spaced relationship thereto;

said first biasing means comprising a first spring disposed about said shaft and engaging said second hook means;

said stop means comprising a flange extending outwardly from each side of said member;

said second biasing means comprising a second spring;

said second pivotal means comprising an aperture in said body support means and an eyelet disposed in said aperture and connected to said first hook means to allow said first hook means to pivotally rotate;

said first hook means comprising at least one hook-shaped member having at least one barb; and said second hook means comprising at least one hook-shaped member having at least one barb.

26. A fishing lure comprising: body support means for connection to a fishing line;

a first hook means connected to said body support means adapted to be engaged by a fish;

a second hook means connected to said body support means for engaging the fish and having an open cocked position and a closed position engaging the fish;

first pivotal means for allowing said second hook means to pivotally rotate relative to said first hook means;

first biasing means for pivotally biasing said second hook means toward said first hook means;

second pivotal means for allowing said first hook means to pivotally rotate;

said second hook means including a projection means forming a projection connected thereto;

strap means forming a pair of axially spaced straps connected to said body support means;

trip means connected to the line and engaging said second hook means for supporting said second hook means in said open cocked position and for releasing said second hook means to allow said second hook means to move toward said closed position in response to engagement by the fish with said first hook means; said trip means comprising a member having a first end connected to the fishing line and being slidably disposed within said strap means and having a second end slidably disposed in engagement with said projection means to support said second hook means in said open cocked position;

second biasing means removably disposed about said member and between said strap means and said second end of said member for biasing said second end of said member in engagement with said projection means and for providing a predetermined amount of force on said trip means to allow said member to be disengaged with said projection means to release said second hook means from said open cocked position for movement toward said closed position to engage the fish;

said member including stop means for preventing said member from being slidably disposed from said strap means;

said first pivotal means comprising a shaft and a support member connected to said body support means to pivotally support said shaft in spaced relationship thereto;

said first biasing means comprising a first spring disposed about said shaft and engaging said second hook means;

said stop means comprising a flange extending outwardly from each side of said member;

said second biasing means comprising a second spring;

said second pivotal means comprising an aperture in said body support means and an eyelet disposed in said aperture and connected to said first hook means to allow said first hook means to pivotally rotate;

said first hook means comprising at least one hook-shaped member having at least one barb; and said second hook means comprising at least one hook-shaped member having at least one barb.

27. A fishing lure comprising: body support means for connection to a line;

a first hook means connected to said body support means adapted to be engaged by an object;

a second hook means connected to said body support means for engaging the object and having an open cocked position and a closed position engaging the object;

pivotal means for allowing said second hook means to pivotally rotate relative to said first hook means;

first biasing means for biasing said second hook means toward said first hook means;

trip means connected to the line and engaging said second hook means for supporting said second hook means in said open cocked position and for releasing said second hook means to allow said second hook means to move toward said closed position in response to engagement by the object with said first hook means;

second biasing means for adjustably providing a predetermined amount of force on said trip means to release said second hook means from said open cocked position for movement toward said closed position to engage the object;

said pivotal means comprising a shaft and a support member connected to said body support means to pivotally support said shaft in spaced relationship thereto.

* * * * *